United States Patent [19]
Ohshita

[11] Patent Number: 6,044,545
[45] Date of Patent: Apr. 4, 2000

[54] STATOR WINDING METHOD AND STATOR WINDING STRUCTURE

[75] Inventor: Hiromi Ohshita, Nagano-ken, Japan

[73] Assignee: Tamagawa Seiki Kabushiki Kaisha, Nagano-ken, Japan

[21] Appl. No.: 09/066,878

[22] Filed: Apr. 28, 1998

[30] Foreign Application Priority Data

Nov. 14, 1997 [JP] Japan .................................. 9-313586

[51] Int. Cl.[7] .................................................. H02K 15/00
[52] U.S. Cl. .............................. 29/596; 29/857; 29/860; 310/42; 310/71
[58] Field of Search ........................... 29/596, 860, 857; 310/42, 71

[56] References Cited

U.S. PATENT DOCUMENTS 5,760,505  6/1998  Farou et al. .............................. 310/71

*Primary Examiner*—P. W. Echols
*Assistant Examiner*—John C. Hong
*Attorney, Agent, or Firm*—Sughrue, Mion, Zinn Macpeak & Seas, PLLC

[57] ABSTRACT

In a stator winding method and a stator winding structure, the ends (4a) of windings (4) are caused to become entangled with terminals (6) through a longitudinal rod member (10) and form slack portions (4aA) when the longitudinal rod member is removed, whereby the vibration resistance and impact resistance of the windings can be improved as well as the break thereof can be prevented.

2 Claims, 2 Drawing Sheets

STATOR WINDING METHOD AND STATOR WINDING STRUCTURE

BACKGROUND OF THE INVENTION

1. Field of the Invention

The present invention relates to a stator winding method and a stator winding structure, and more specifically, to a novel improvement in the vibration resistance and impact resistance of windings and the prevention of the break thereof caused by a temperature change, the improvement being achieved by forming slack portions to the windings when they are wound around the teeth of a stator and connected to terminals.

2. Description of the Related Art

In general, the structure shown in FIG. 1 is conventionally employed as this type of the stator winding method and the stator winding structure. That is, what is denoted by numeral 1 in FIG. 1 is a stator which is formed to a ring-shape as a whole and has a plurality of teeth 2 projecting inward and stator insulation covers 3 formed to a ring-shape are disposed to the stator 1 so as to cover the respective teeth 2. Windings 4 are wound around the respective teeth 2 through the outer peripheries of the stator insulation covers 3 by a specific winding method using a not shown winding machine and the ends 4a of the windings 4 are caused to automatically become entangled with and directly connected to the respective terminals 6 of the terminal plate 5 of the stator insulation covers 3.

Since the prior art stator winding method and stator winding structure are arranged as described above, they have the following problems.

Since the ends of the windings which are wound around the respective teeth are directly wound around the terminals, these ends are stretched between the teeth and the terminals under a tension without any slack. Thus, the ends have low reliability of impact resistance and vibration resistance and prevention of break thereof in use. Thus, the improvement of the reliability has been desired.

An object of the present invention made to solve the above problems is to provide a stator winding method and a stator winding structure capable of improving the vibration resistance and impact resistance of windings and preventing the break thereof caused by a temperature change by forming slack portions to the windings when the windings wound around the teeth of a stator are connected to terminals.

SUMMARY OF THE INVENTION

According to the present invention, a stator winding method of winding windings around the respective teeth of a stator and connecting the ends of the windings to terminals attached to the terminal plate of the stator insulation covers provided with the stator, the method comprising the steps of positioning a longitudinal rod member between the teeth and the terminals; connecting the windings to the terminals in the state that the windings stride over the longitudinal rod member; and removing the longitudinal rod member to thereby form slack portions to the windings which are located between the teeth and the terminals. Further, according to the present invention, a stator winding structure for winding windings around the respective teeth of a stator and connecting the ends of the windings to terminals attached to the terminal plate of the stator insulation covers provided with the stator comprises slack portions formed by being caused to stride over a longitudinal rod member which is disposed between the teeth and the terminals when the windings are connected.

DESCRIPTION OF THE PREFERRED EMBODIMENT

A preferred embodiment of a stator winding method and a stator winding structure according to the present invention will be described with reference to the drawings. Parts similar to those of the prior art are described using the same numerals.

Figure 1:
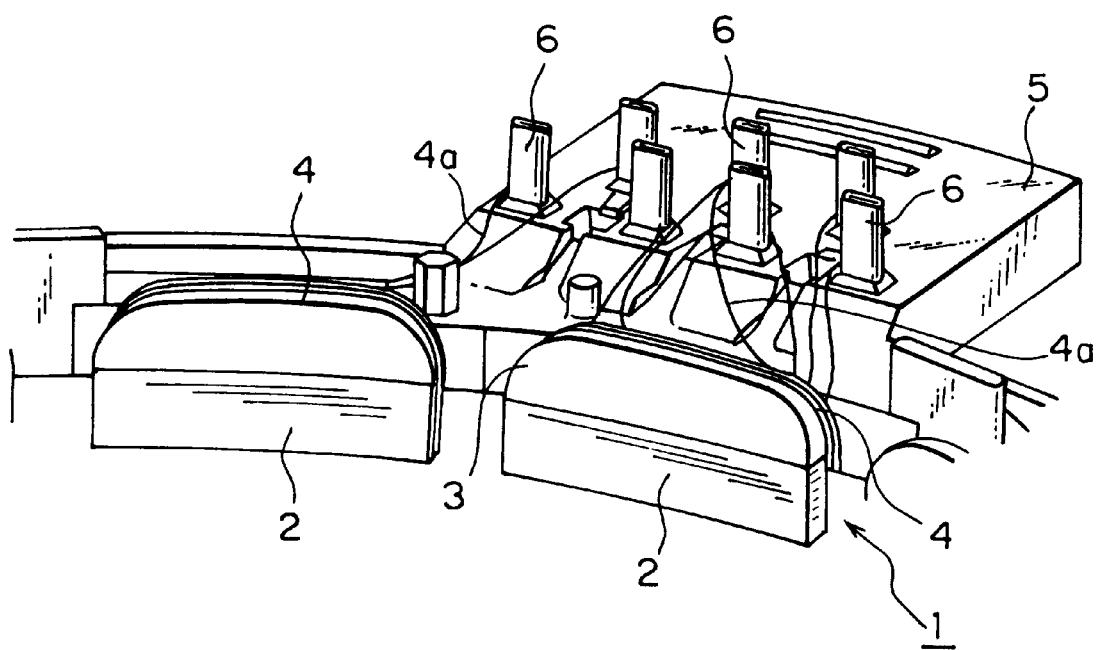
FIG. 1 is a view showing the arrangement of prior art stator windings.
Figure 2:
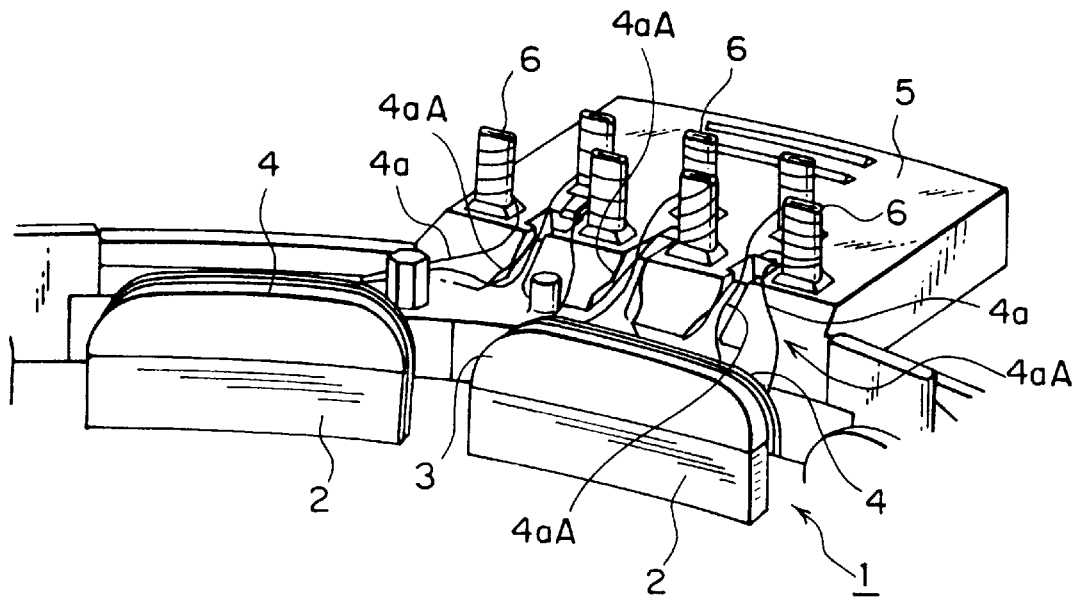
FIG. 2 is a view showing a stator winding method and a stator winding structure according to the present invention.
Figure 3:
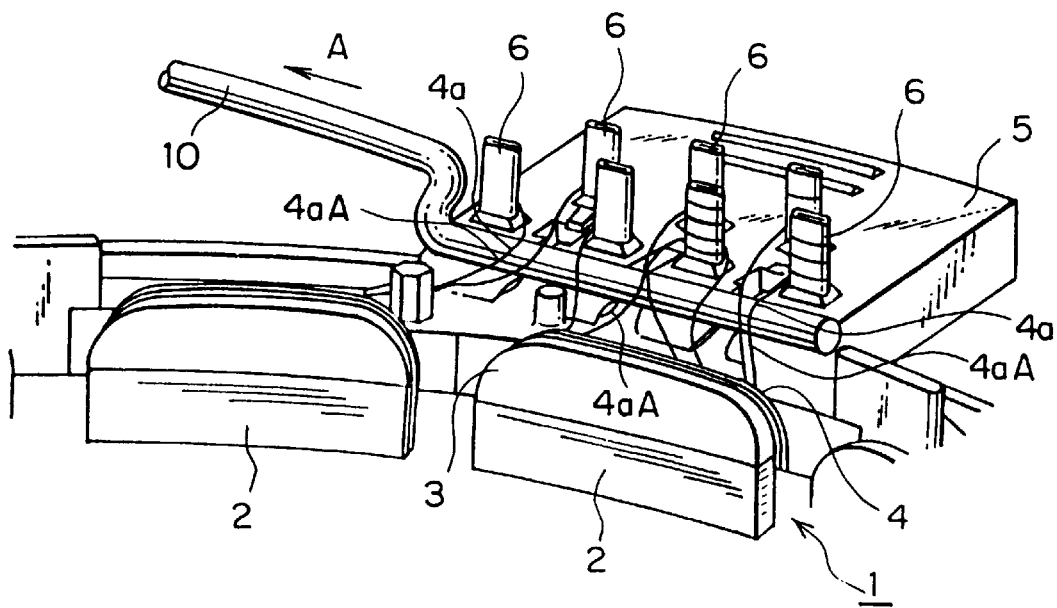
FIG. 3 is a view showing the state that winding is being performed in FIG. 1.

As shown in FIG. 3, a stator 1 which is formed to a ring-shape and has a plurality of teeth 2 projecting inward and ring-shaped stator insulation covers 3 are disposed to the respective teeth 2 of the stator 1 to insulate the teeth 2 from windings 4. The windings 4 are wound around the respective teeth 2 through the outer peripheries of the stator insulation covers 3 by a known specific winding method using a not shown winding machine. Since a longitudinal rod member 10 provided with the winding machine is inserted and positioned between the teeth 2 and the terminals 6 above the teeth 2 before the ends 4a of the windings 4 are connected to the terminals 6 of a terminal plate 5 disposed to the stator 1 integrally with the stator insulation covers 3, the ends 4a are connected to the respective terminals 6 by being caused to become entangled therewith while coming into contact with the upper surface of the longitudinal rod member 10. On the completion of the connection of the ends 4a to the terminal pins 6, slack portions 4aA are formed to the ends 4a as shown in FIG. 2 when the longitudinal rod member 10 is removed in the direction of an arrow A. The longitudinal rod member 10 may be assembled to the winding machine or arranged as an independent system. In addition, the stator 1 may be applicable to various types of known rotating machines such as a resolver, motor, synchro and the like.

Since the stator winding method and the stator winding structure according to the present invention are arranged as described above, the slack portions can be formed to the ends of the windings wound around the teeth, whereby vibration resistance and impact resistance can be improved as well as the break of the windings caused by a temperature change can be prevented. Thus, the reliability of various rotating machines can be greatly improved.

What is claimed is:

1. A stator winding method of winding a plurality of windings around a corresponding plurality of teeth of a stator, respectively, and connecting ends of the plurality of windings to a corresponding plurality of terminals, respectively, the plurality of terminals attached to a terminal plate of the stator, comprising the steps of:

positioning a longitudinal rod member between the plurality of teeth and the plurality of terminals;

connecting the plurality of windings to the plurality terminals, respectively, so that the plurality of windings stride over the longitudinal rod member; and removing the longitudinal rod member from the plurality of windings to thereby form slack portions in the windings, the slack portions located between the plurality of teeth and the plurality of terminals.

2. The stator winding method according to claim 1, wherein the stator winding method uses a winding machine, and wherein the longitudinal rod member is mounted to the winding machine.

* * * * *